Dec. 20, 1966 W. HEER 3,292,467
LATHE TAILSTOCK
Filed Aug. 14, 1964
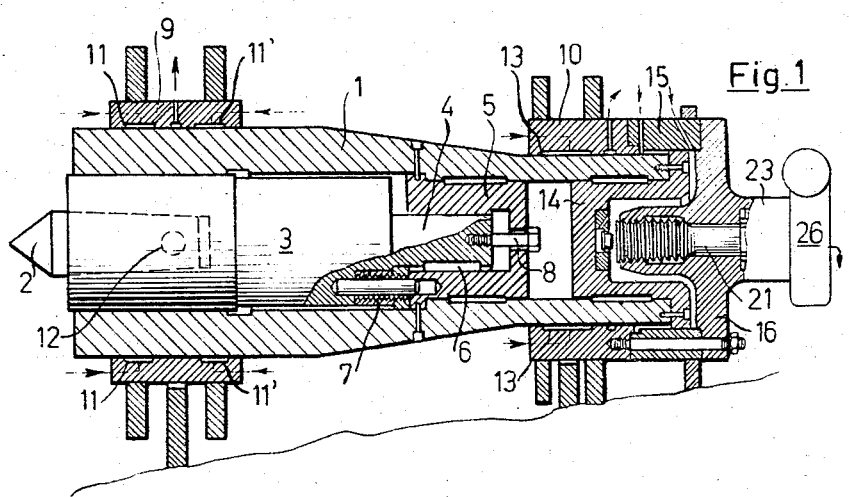
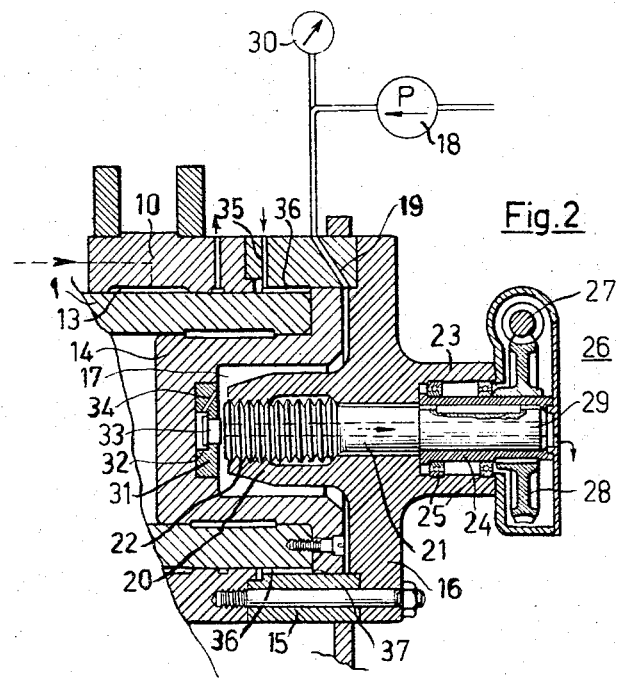
INVENTOR.
WALTER HEER
BY
Dodge and Sons
ATTORNEYS United States Patent Office 3,292,467
Patented Dec. 20, 1966

3,292,467
LATHE TAILSTOCK
Walter Heer, Zurich, Switzerland, assignor to Escher Wyss Aktiengesellschaft, Zurich, Switzerland, a corporation of Switzerland
Filed Aug. 14, 1964, Ser. No. 389,669
Claims priority, application Switzerland, Oct. 14, 1963, 12,572
6 Claims. (Cl. 82—31)

This invention relates to a lathe tailstock with tailstock sleeve and rotatable center inserted therein.

It is known to mount the sleeve of a tailstock axially slidable but non-rotatable and to allow the center to rotate therein. For the rotatable mounting, however, there is only relatively small room in the sleeve. In lathes which have to accommodate considerable loads, therefore, it is difficult or even impossible to make the mounting of the center sturdy enough.

The invention overcomes this difficulty. It comprises, in a tailstock of the kind hereinbefore described, mounting the sleeve for rotation on its axis and connecting the center non-rotatably with the sleeve. A hydrostatic bearing sustains the thrust load on the rotary sleeve.

Since the center should revolve easily, even under considerable load, there is preferably provided for the radial mounting of the sleeve at least one hydrostatic bearing having a bearing bush which is self-adjusting in inclination, and advantageously the tailstock sleeve is also hydrostatically supported in the axial direction.

A constructional example of the subject of the invention is represented diagrammatically in the drawing. FIG. 1 shows a longitudinal section, and FIG. 2 a part thereof on a larger scale.

The tailstock comprises a sleeve 1 and a center 2. The center is fast in a cylindrical body 3 carried in the sleeve 1, and having an extension 4 of smaller diameter on the end opposite the center 2. This extension is surrounded by a cap 5, inserted in the sleeve 1 and non-rotatably secured thereto, a key 6 in its turn establishing non-rotatable connection between the cap 5 and the extension 4, while permitting axial displacement of this extension 4 in the cap 5. The center 2 is thus non-rotatably connected to the sleeve 1 through body 3 with extension 4, key 6 and cap 5.

The body 3 is axially supported on the cap 5 by interposed cup springs 7, of which only one is shown in the drawing, and which are pre-stressed by a screw 8, drawing the extension 4 toward the base of the cap 5. Resilient axial support of the center 2 within the sleeve 1 is thus provided.

The sleeve 1 is mounted for rotation about its axis in two radial bearings having bearing bushes 9 and 10. These bearings are constructed as hydrostatic bearings. The bearing bush 9 in its sliding surface has two axially adjacent rows of a number of pockets 11, 11', distributed along the periphery, each of which is adapted to be supplied in the manner known per se with pressure by its own separate pump or by a common pump through a respective throttling point. The bearing bush 9, in a manner not shown in detail, is pivotally mounted in the tailstock slide on a horizontal pivot 12, so that it is self-adjustable in inclination and can adapt itself to the inclination of the sleeve axis at the bearing point, which inclination is produced under load, owing to bending of the sleeve 1. The bearing bush 10 is also a hydrostatic bearing having a row of a number of pockets 13, distributed over the periphery and charged with pressure liquid.

The sleeve 1 is also hydrostatically supported in the axial direction. It is provided with a cover 14, which is mounted co-axially with the sleeve at its end opposite the center 2 and is axially slidable in a cylinder 15. The cylinder 15 is rigidly secured to the tailstock slide and also carries the bearing bush 10. At its ends, it is closed by a cover 16.

A cylinder chamber 17 is left free between the cover 14 of sleeve 1 and the cylinder cover 16. According to FIG. 2, this chamber is supplied with pressure liquid by a pump 18 through a duct 19. The cover 14 is cup-shaped. A tubular extension 20 of the cylinder cover 16 co-axial with the sleeve 1, extends into the chamber 17. A piston in the form of a screwthreaded spindle 21, likewise co-axial with the sleeve 1, engages an internal screwthread 22 of the extension 20 and is mounted in an external extension of the cover 16. It carries at this place a bush 24 non-rotatably connected to it, in which however it can move axially. The bush 24 is supported in the cover extension 23 by means of anti-friction bearings 25. Furthermore attached to said extension 23 is a preferably self-locking worm gear 26 with worm 27 and wheel 28. The wheel 28 is fast on the bush 24.

The spindle 21 can be set in rotation from the outside by means of the worm gear 26, being thereby screwed in the thread 22 and moving axially.

The screwthreaded spindle 21 projects with its end face into the cylinder chamber 17 and has an axial bore 29, through which liquid can be discharged from the cylinder chamber 17, as long as the spindle 21 does not bear firmly with its end face against the opposite surface of the sleeve cover 14.

The pump 18 is so designed that it delivers continuously a certain quantity of liquid per unit time to the cylinder chamber 17. In operation, an annular throttling gap is left between the bottom of the piston and the end face of the spindle 21 for the discharge of said liquid into the bore 29 of the spindle 21. The farther the spindle 21 is moved by means of the worm gear 26 in its axial direction toward the end face of the sleeve 1 formed by the cover 14, the greater will be the pressure of the liquid set up in the cylinder chamber 17, and the greater therefore will be also the force with which the center 2 is pressed against the chucked workpiece, the springs 7 thereby being compressed.

By means of the spindle 21, therefore, a certain desired application pressure can be adjusted. A pressure gauge 30 indicates the pressure of the liquid in the cylinder chamber 17. With relatively small delivery of the pump 18 a correspondingly narrow gap suffices for the discharge of the liquid from the cylinder chamber 17, so that the end face of spindle 21 is always close to the sleeve cover 14.

In the described embodiment of the subject of the invention, the sleeve 1 is thus supported hydrostatically in the axial direction. Metallic contact between the rotating cover 14 of the sleeve 1 and the end face of the stationary spindle 21 is avoided. The cover 14, which is rigidly connected to the sleeve 1 and the position of which thus depends on the axial position of the sleeve 1, forms with the spindle 21, which is adjustable by external action, a control unit influencing the pressure of the liquid of the hydrostatic support. The sleeve cover 14 and the spindle 21 are here two elements of said control unit, and confine the discharge gap for the liquid acting on the piston 14.

The end face of spindle 21 is so large that in the event of failure of liquid pressure in the cylinder chamber 17, it may serve as emergency bearing surface for the sleeve cover 14 then coming into contact with it.

In the embodiment of the subject of the invention as represented, provision is furthermore made to ensure that the surface parts, which in operation confine the discharge gap for the liquid, do not themselves serve as emergency bearing surfaces, in which case they would possibly be subject to wear. For this purpose, the middle portion of the sleeve cover 14 facing the spindle 21 is constructed as a plate 31 set into the other part. In a stepped recess 32 of this plate 31 is a throttling element 33, formed as a stepped piston and movable in the axial direction, the smaller piston part of which has a smaller diameter than the end face of spindle 21, and in one end position projects somewhat beyond the surface of the plate 31, while in the other end position it is sunk into the plate 31.

The rear side of this element 33, that is to say, the piston part of larger diameter is connected to the cylinder chamber 17 by a passage 34. As long as an excess pressure predominates in the cylinder chamber 17, the element 33 will be held in the first-mentioned end position. The discharge gap, which is decisive in controlling the liquid pressure in the cylinder chamber 17, will then be confined by the mutually opposite end face of the element 33 and spindle 21.

As soon, however, with the workpiece chucked, as the liquid pressure in the cylinder chamber falls, for example through failure of supply of liquid by the pump 18, the sleeve 1 is shifted by the force of springs 7 toward the spindle 21, until finally the plate 31, with its face situated outside the element 33 and facing the spindle 21, bears against the part opposite to it of the end face of spindle 21. These two faces then serve as emergency bearing faces, the element 33 being sunk into the plate 31 and bearing against the end face of spindle 21 either not at all or at the most with slight pressure.

Since even with the center 2 unloaded, the sleeve 1 is forced with a certain pressure toward the spindle 21, in the embodiment shown, in the cylinder 15, on the opposite side to the cylinder chamber 17, an annular gap 36 charged with pressure liquid through a duct 35 is left free. The liquid here presses against the pressure of the hydrostatic support on the annular face 37 of the sleeve or its cover 14, rigidly secured to it, against the pressure of the hydrostatic support. The effect of this is that even with the center 2 unloaded, the sleeve 1 follows the spindle 21, when the latter is retracted.

What is claimed is:

1. A lathe tailstock comprising a support; a sleeve mounted for rotation and axial movement in said support; a center non-rotatably secured to said sleeve at one end thereof, said sleeve and center being coaxial; a pressure chamber at the other end of the sleeve, said chamber being defined by the support and a transverse wall of the sleeve, pressure in said chamber reacting against said wall to provide a hydrostatic thrust bearing sustaining the sleeve in the axial direction.

2. The combination defined in claim 1 in which said support comprises at least one hydrostatic radial bearing having a self-adjusting bearing bush in which said sleeve is supported, said bush being mounted to pivot about a horizontal axis transverse to the axis of the sleeve.

3. The combination defined in claim 1 in which the pressure chamber includes an inlet for pressure fluid and piston mounted in said support co-axially with the sleeve so as to be displaceable in the axial direction; said piston having a face within said chamber directed toward the face of the sleeve opposite to the center so as to define therewith an annular throttling gap for the outflow of liquid from said chamber; and means for axially displacing said piston from outside of the support.

4. The combination defined in claim 3 in which said piston is formed as a stationary screwthreaded spindle having an end face directed toward the sleeve; at least part of said end face of the spindle and the corresponding part of the end face of the sleeve being dimensioned to serve as emergency bearing surfaces in the event of failure of the liquid pressure.

5. The combination defined in claim 4 in which said spindle has a longitudinal bore for the discharge of the liquid issuing from the throttling gap.

6. The combination defined in claim 4 in which one of said faces of the sleeve and the spindle has a central recess; a throttling member being disposed displaceably in this recess so as to be subjected on its rear side to the liquid pressure prevailing in the cylinder chamber; a stop being provided for retaining said throttling member in a position in which it projects beyond said emergency bearing surface and forms with its front side of the boundaries of said annular throttling gap; and said recess being dimensioned to allow said throttling member to be sunk below the emergency bearing surface in the event of failure of the liquid pressure.

References Cited by the Examiner

UNITED STATES PATENTS

| | | | |
|---|---|---|---|
| 1,736,967 | 10/1929 | Fraser | 82—31 X |
| 2,507,155 | 5/1950 | Gruen et al. | 77—60 X |
| 2,910,905 | 10/1959 | Gamet | 82—31 |
| 3,198,042 | 8/1965 | Binns | 82—31 |

WILLIAM W. DYER, Jr., *Primary Examiner.*

LEONIDAS VLACHOS, *Examiner.*